United States Patent

Wicht

Patent Number: 5,259,151
Date of Patent: Nov. 9, 1993

[54] FISH LINE SINKER

[76] Inventor: John E. Wicht, 17515 Territorial Rd., Osseo, Minn. 55369

[21] Appl. No.: 811,850

[22] Filed: Dec. 23, 1991

[51] Int. Cl.$^5$ .................. A01K 85/00; A01K 95/00
[52] U.S. Cl. ..................................... 43/42.31; 43/44.9
[58] Field of Search ............... 43/44.81, 44.9, 42.31

[56] References Cited

U.S. PATENT DOCUMENTS

| | | | |
|---|---|---|---|
| 3,848,353 | 11/1974 | McClellan | 43/42.31 |
| 4,008,539 | 2/1977 | Gardner | 43/44.9 |
| 4,969,287 | 11/1990 | Johnson | 43/42.31 |
| 4,995,189 | 2/1991 | Crihfield | 43/44.9 |

FOREIGN PATENT DOCUMENTS 2207841  2/1989  United Kingdom ............. 43/44.81

Primary Examiner—Paula A. Bradley
Assistant Examiner—Jeanne M. Elpel
Attorney, Agent, or Firm—Burd, Bartz & Gutenkauf

[57] ABSTRACT

A noise-making fish line sinker including an inner chamber with one or more noise-making elements loosely held within the chamber. The sinker has a bullet-shaped body with a generally cylindrical base at one end tapering to a blunt point at the other. A central generally cylindrical cavity extends into the body from the base end. A generally cylindrical plug tightly fit into the base end of the cavity partially fills the cavity and defines one wall of the chamber. A central line-receiving passage extends through the sinker body and plug.

11 Claims, 1 Drawing Sheet

FISH LINE SINKER

BACKGROUND OF THE INVENTION

1. FIELD OF THE INVENTION

This invention is directed to a fish line sinker used for the purpose of sinking the fish hooks and bait toward the bottom of the body of water being fished. More particularly, the invention is directed to a precision machined solid brass noise-making fish line sinker especially adapted for use in angling for bass.

2. THE PRIOR ART

Kahle U.S. Pat. No. 1,858,550 discloses a a sinker having a tubular body which contains a plurality of lead shot. The purpose of the lead shot is to permit varying the weight of the sinker. The patent does not disclose any resulting production of noise.

Steffensen U.S. Pat. No. 1,878,015 discloses a fish lure having a two-part metal body, the parts being separable and screwed together. Ordinarily this lure is intended to be light enough to float and skim through the upper surface of the water. However, its weight may be increased by adding shot for use at lower depths. There is no disclosure of any resulting production of noise.

The Gander Mountain 1991 Spring/Summer catalog, on page 40, shows a "Culprit Clatter Weight" which is described as a clattering worm weight that attracts fish in dark cover, dark water and at night. It includes a hollow body containing shot or similar weights. Nothing is disclosed as to the materials from which either the body or shot are made. The trademark "CULPRIT" is owned by Classic Manufacturing Co., Inc. of Ocoee, Fla. which, on May 15, 1990, filed an application for registration of "CLATTER WEIGHT" as a trademark, based on use from Mar. 11, 1989.

SUMMARY OF THE INVENTION

The fish line sinker according to the present invention comprises an ogival or bullet-shaped body formed from a relatively dense material having high specific gravity and having a generally cylindrical base at one end with a symmetrical body surface tapering to a blunt point at the other end. A central generally cylindrical cavity extends inwardly into the body from the base end. A central line-receiving passage extends from the inner end of the cavity to the blunt pointed end of the body. A generally cylindrical plug is tightly fit into the base end of the cavity partially filling it. A central line-receiving passage extends through the plug. A chamber is formed between the end of the plug and the inner end of the cavity within the body. At least one noise-making element is loosely held in that chamber.

BRIEF DESCRIPTION OF THE DRAWINGS

The invention is illustrated by the accompanying drawings in which corresponding parts are identified by the same numerals and in which.

DETAILED DESCRIPTION OF THE PREFERRED EMBODIMENT

Figure 1:
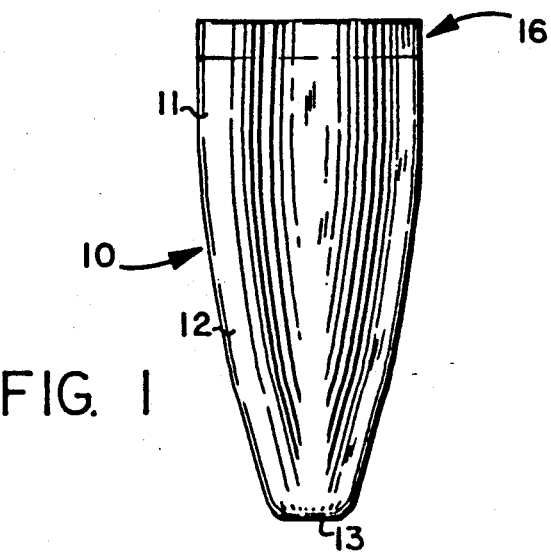
FIG. 1 is an elevational view of the fish line sinker according to the present invention.
Figure 2:
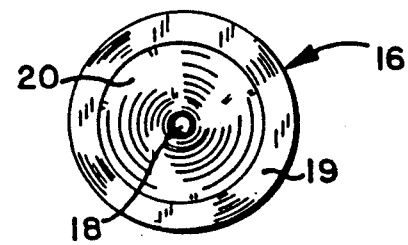
FIG. 2 is a base end view thereof.

Referring now to the drawings, and particularly to FIGS. 1 through 4, the fish line sinker according to the present invention comprises an ogival or bullet-shaped body, indicated generally at 10, having a generally cylindrical base 11 at one end and a symmetrical ogival body surface 12 tapering to a blunt point 13 at the other end. A generally cylindrical central cavity 14 formed in the body 10 extends inwardly from the base end. As shown, cavity 14 extends about one half the length of body 10. It has an inner cylindrical side wall and a flat end wall. A central line-receiving passage 15 extends from the inner end of cavity 14 to the blunt end 13 of the body.

A generally cylindrical plug, indicated generally at 16, is fit tightly into the base end of cavity 14 partially filling that cavity and defining a chamber 17 between the inner end of the plug and the inner end of the cavity. As shown, plug 16 has a flat inner end. A central line-receiving passage 18 extends through plug 16 in longitudinal alignment with passage 15. Preferably the outer end of plug 16 has an integral annular lip 19 of diameter corresponding generally to the diameter of the base end 11 of the body and forming a shoulder in engagement with the annular base end of the body 10. Preferably also a central inwardly tapering concave cavity 20 extends from the outer end of plug 16 to the central passage 18 to fascilitate threading of line through the passages.

Body 10 and plug 16 are formed, preferably by precision machining, from a dense material having high specific gravity so as to sink in water, such as metal. Brass is a preferred material. The parts are preferably precision formed so that they may be fit together with a tight press fit. Although the size of the sinker is not critical, typically sinkers are made available in a variety of sizes and weights. One exemplary sinker is about 5/16 inch in diameter at the base and about one inch long.

Figure 3:
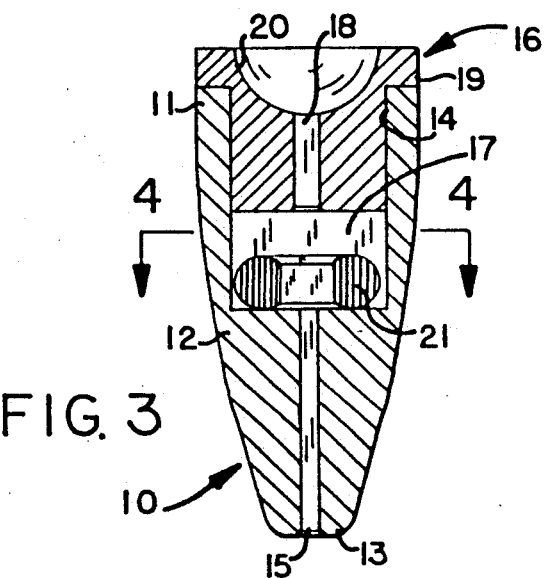
FIG. 3 is a longitudinal section showing one form of sinker construction.
Figure 4:
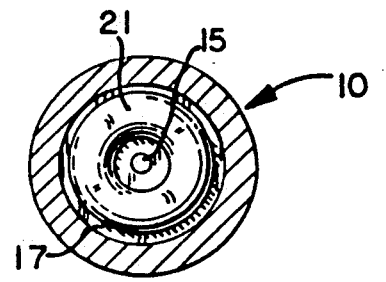
FIG. 4 is a transverse section on the line 4—4 of FIG. 3 and in the direction of the arrows.

As seen in FIGS. 3 and 4, chamber 17 contains a noise-making element in the form of a donut-shaped annular ring 21. Ring 21 has a diameter less than the diameter of chamber 17 and a thickness less than the depth of the chamber so that the ring is free for limited movement within the chamber. Thus, when the sinker is jiggled or otherwise moved while in use in fishing, the movement of ring 21 within chamber 17 causes a rattling, clattering or clicking noise.

Figure 5:
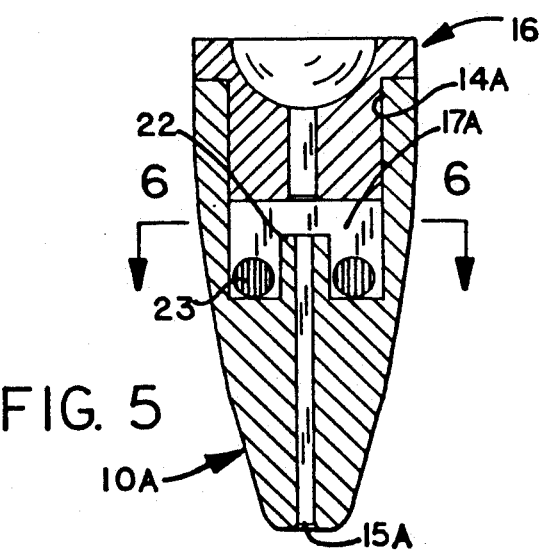
FIG. 5 is a longitudinal section showing an alternative form of sinker construction.
Figure 6:
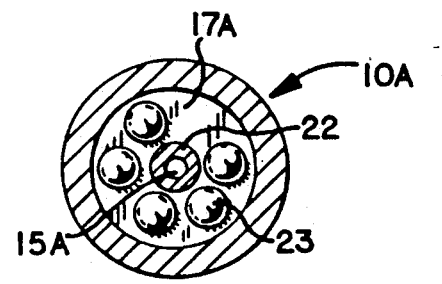
FIG. 6 is a transverse section on the line 6—6 of FIG. 5 and in the direction of the arrows.

Referring to FIGS. 5 and 6, there is shown a sinker identical in all material respects to that already described, except that sinker body 10A includes an annular flange 22 surrounding the central passage 15A through the body and extending longitudinal inwardly into the cavity 17A from the flat inner end wall of the cavity in which the chamber is formed. Flange 22 defines an annular channel with the body wall within the chamber 17A at the inner end of the cavity 14A. A plurality of spherical balls 23, such as shot, are disposed in the annular channel for free limited movement therein. The space between the end of flange 22 and the inner end of plug 16 is less than the diameter of balls 23 to ensure that the balls remain in the annular channel. When the sinker is jiggled of otherwise moved while in use, balls 23 are free to move within the chamber producing a rattling, clattering or clicking noise. The sizes and numbers of balls may be varied so long as room remains for movement.

The noise-making sinker according to the present invention is used in the conventional manner. In some instances the fish line sinker may slide freely along the fish line. In other instances it may be affixed to the line at a set position by inserting a wedge, such as a toothpick, or a rubber band into one of the line-receiving passages along with the line.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A fish line sinker which comprises:
   A) an ogival or bullet-shaped body formed from a relatively dense material having high specific gravity so as to sink in water and having:
      1) a generally cylindrical base at one end, and a symmetrical body surface tapering to a blunt point at the other end,
      2) a central generally cylindrical cavity in the body extending inwardly from the base end, said cavity extending about one half the length of said body and having an inner cylindrical side wall and a flat inner end wall,
      3) a central line-receiving passage from the inner end of said cavity to said point,
   B) a generally cylindrical plug tightly fit in a press fit in the base end of the body in engagement with the inner wall of said cavity and partially filling the cavity, said plug having a flat inner end and having a central line-receiving passage through said plug,
   C) a chamber between the flat end of said plug and the flat inner end wall of said cavity, and
   D) at least one noise-making element loosely held in said chamber.

2. A fish line sinker according to claim 1 wherein the outer end of said plug has an integral annular lip of diameter corresponding generally to the diameter of the base end of the body and forming a shoulder in engagement with the annular base end of the body.

3. A fish line sinker according to claim 2 wherein a central inwardly tapering cavity extends from the outer end of the plug to said central passage.

4. A fish line sinker according to claim 1 wherein said noise-making element is an annular donut-shaped ring.

5. A fish line sinker according to claim 1 wherein said noise-making element is a spherical ball.

6. A fish line sinker according to claim 5 wherein an annular flange surrounding the central passage through the sinker body extends longitudinally inwardly into the cavity from the flat inner end wall of the cavity and spaced from the cylindrical inner wall thereof to form an annular channel and a plurality of spherical balls are disposed in the annular channel between the flange and chamber wall.

7. A fish line sinker according to claim 1 wherein said sinker body and plug are formed of brass.

8. A fish line sinker especially adapted for angling for bass which comprises:
   A) an ogival or bullet-shaped brass body having:
      1) a generally cylindrical base at one end and a symmetrical body surface tapering to a blunt point at the other end,
      2) a central generally cylindrical cavity in the body extending inwardly from the base end, said cavity extending about one half the length of said body and having an inner cylindrical side wall and a flat inner end wall,
      3) a central line-receiving passage from the inner end of said cavity to said point,
   B) a generally cylindrical flat ended plug tightly fit in a press fit in the base end of the body in engagement with the inner wall of said cavity and partially filling the cavity and having:
      1) a central line-receiving passage through the plug,
      2) an integral annular lip at the outer end of the plug of diameter corresponding generally to the diameter of the base end of the body and forming a shoulder in engagement with the annular base end of the body, and
      3) a central inwardly tapering cavity extending from the outer end of the plug to said central passage,
   C) a chamber between the flat end of said plug and the flat inner end wall of said cavity, and
   D) at least one noise-making element loosely held in said chamber.

9. A fish line sinker according to claim 8 wherein said noise-making element is an annular donut-shaped ring.

10. A fish line sinker according to claim 8 wherein said noise-making element is a spherical ball.

11. A fish line sinker according to claim 10 wherein an annular flange surrounding the central passage through the sinker body extends longitudinally inwardly into the cavity from the flat inner end wall of the cavity and spaced from the cylindrical inner wall thereof to form an annular channel and a plurality of spherical balls are disposed in the annular channel between the flange and chamber wall.

* * * * *